United States Patent
Quigley

(10) Patent No.: US 6,575,279 B2
(45) Date of Patent: Jun. 10, 2003

(54) LAMINATED ONE WAY CLUTCH RACE

(75) Inventor: James R. Quigley, Lombard, IL (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 09/867,091

(22) Filed: May 29, 2001

(65) Prior Publication Data

US 2002/0179392 A1 Dec. 5, 2002

(51) Int. Cl.$^7$ ............................ F16D 11/16; F16D 41/18
(52) U.S. Cl. ..................................... 192/46; 192/107 T
(58) Field of Search ................... 192/41 R, 46, 192/107 T

(56) References Cited

U.S. PATENT DOCUMENTS

| | | | |
|---|---|---|---|
| 4,260,047 A | * 4/1981 | Nels | 192/107 R X |
| 4,845,832 A | 7/1989 | Martin et al. | |
| 5,165,509 A | * 11/1992 | Kanno et al. | 192/44 |
| 5,671,836 A | * 9/1997 | Shirataki et al. | 192/113.32 |
| 5,678,668 A | * 10/1997 | Sink | 192/46 |
| 5,718,114 A | 2/1998 | Murata et al. | |
| 5,722,521 A | 3/1998 | Awaji et al. | |
| 5,758,755 A | 6/1998 | Igari | |
| 5,822,987 A | 10/1998 | Tsukamoto et al. | |
| 5,842,548 A | 12/1998 | Sato et al. | |
| 5,852,932 A | 12/1998 | Matsumoto | |
| 5,853,073 A | 12/1998 | Costin | |
| 5,896,967 A | 4/1999 | Igari et al. | |
| 5,915,750 A | 6/1999 | Usher et al. | |
| 5,928,104 A | 7/1999 | Kimura et al. | |
| 5,941,355 A | 8/1999 | Iga | |
| 5,947,245 A | 9/1999 | Costin et al. | |
| 5,954,174 A | 9/1999 | Costin | |
| 5,957,251 A | 9/1999 | Jones et al. | |
| 5,964,331 A | * 10/1999 | Reed et al. | 192/46 |
| 5,971,122 A | 10/1999 | Costin et al. | |
| 5,979,626 A | 11/1999 | Igari et al. | |
| 6,024,197 A | 2/2000 | Suwa et al. | |
| 6,148,979 A | * 11/2000 | Roach et al. | 192/46 X |
| 6,333,112 B1 | * 12/2001 | Field et al. | 192/41 R X |
| 6,338,403 B1 | * 1/2002 | Costin et al. | 192/46 |

FOREIGN PATENT DOCUMENTS

| | | | | |
|---|---|---|---|---|
| JP | 60-249738 A | * 12/1985 | | 192/45 |

* cited by examiner

Primary Examiner—Richard M. Lorence
(74) Attorney, Agent, or Firm—Emch, Schaffer, Schaub & Porcello Co., L.P.A.

(57) ABSTRACT

A clutch race is formed from multiple layers of stampings which are joined together. Each of the stampings has a plurality of semi-perfs which include a protrusion on one side and pocket on the opposing side. The protrusions of one layer are interconnected with the pockets of an adjacent layer. The stampings forming the individual layers may either define a complete circle or an arcuate segment of a circle, which arcuate segments, when assembled, form a circular layer to be joined with adjacent layers.

9 Claims, 5 Drawing Sheets

LAMINATED ONE WAY CLUTCH RACE

TECHNICAL FIELD

The present application is directed to a laminated race for a one-way clutch. Stacks of laminations are assembled to form the clutch race.

BACKGROUND OF THE INVENTION

One way clutches (OWC) of the type used in automotive transmissions and other applications are constructed using inner and outer races. The inner and outer races provide a number of features such as radial and axial bearing surfaces, clutch engagement surfaces, lubricating channels, axial parts retention, inside and outside torque transfer splines and engagement springs. One-way clutches are currently made using varied construction of the inner and outer races. Such varied construction includes wrought-machined steel, powdered metal (forged and conventional) and the like. These types of construction for the inner and outer races are costly and require secondary processing for the drilling of oil holes and other features.

SUMMARY OF THE INVENTION

The present invention provides OWC inner and/or outer races using a laminated stack of stamped material such as steel. Laminated stampings for such races allows the use of lower cost material, high-speed stamping and automatic assembly techniques. The use of a plurality of layers joined together to form laminates for such races minimizes or eliminates secondary finishing operations further contributing to the low cost. Various features can be incorporated into the stamping operation such as spring pockets stamped into single or multiple layers of laminate, springs stamped into a single or multiple layers of laminate and oil supply holes stamped in layers of the laminates. Each of the layers of the laminate used for such races can be stamped or otherwise manufactured in a plurality of arcuate sections which are assembled or manufactured as a complete annular (circular) unit.

IN THE DRAWINGS

DETAILED DESCRIPTION OF THE INVENTION

Figure 1:
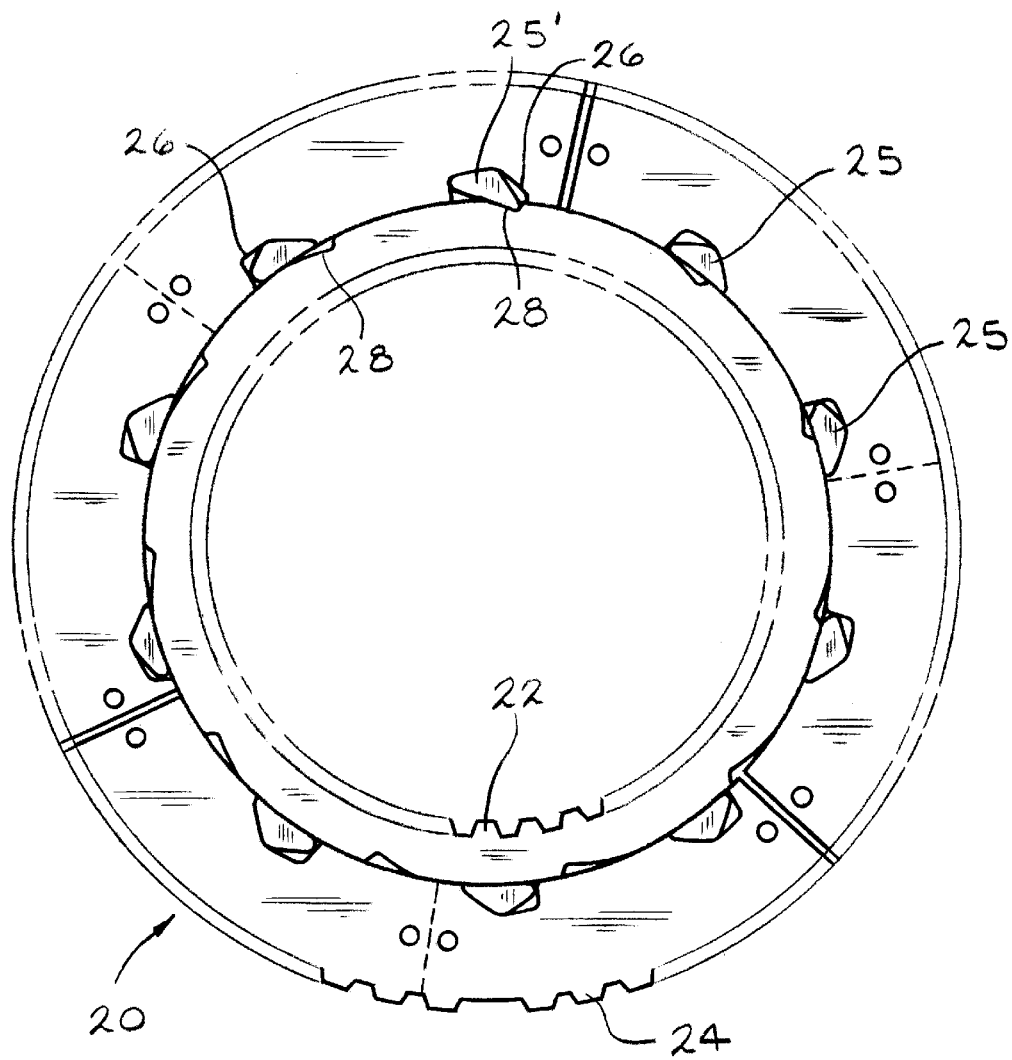
FIG. 1 is an illustration of a pawl ratchet-type one-way clutch assembly.

FIG. 1 schematically illustrates a ratchet one-way clutch assembly 20 which includes an inner race 22, an outer race 24 and a plurality of individual pawl members 25. The pawl members 25 are positioned in pockets 26 in the outer race 24. A plurality of notches 28 are positioned in the outer circumference or periphery of the inner race 22.

When the motion of the inner race 22 relative to the outer race 24 is in the clockwise direction in FIG. 1, the inner race 22 rotates freely. When the relative motion of the inner race 22 relative to the outer race 24 is counter-clockwise, the inner race 22 and outer race 24 are locked together by one or more of the pawls 25. In FIG. 1, the locked pawl is indicated by the reference numeral 25'. The pawl 25' transmits force through pocket 26 in the outer race 24 and notch 28 in the inner race 22. Further details of a pawl-ratchet type one-way clutch assembly may be had by reference to U.S. Pat. No. 5,971,122 (incorporated herein by reference) assigned to the assignee of the present invention.

In the prior art, the inner and outer races of one-way clutch assemblies, such as the inner race 22 and the outer race 24 illustrated in FIG. 1, have been manufactured from a single piece of metal with a number of various manufacturing steps required to complete the specific inner or outer race. For example, following machining or forging of the steel, there may be required additional costly secondary processing steps such as drilling of oil holes, placement of spring assemblies, forming inside and outside torque transfer splines and the like. Under the present invention, the inner and outer races comprise a plurality of layers joined together to form a lamination. Each layer may be formed by stamping operations, each of which stamps a single one of the plurality of layers making up the lamination or stamps a portion of such layer. The number of layers required to obtain the desired thickness for the respective inner and outer races will depend on the thickness of each layer. The number of layers of stampings may be varied in order to achieve the required thickness. The potential to vary the number of layers in order to obtain the desired thickness for the inner or outer race permits the race to be assembled to the precise thickness within the specified range of tolerances without the necessity of grinding the front or back face of the race in order to achieve the desired thickness.

Figure 2:
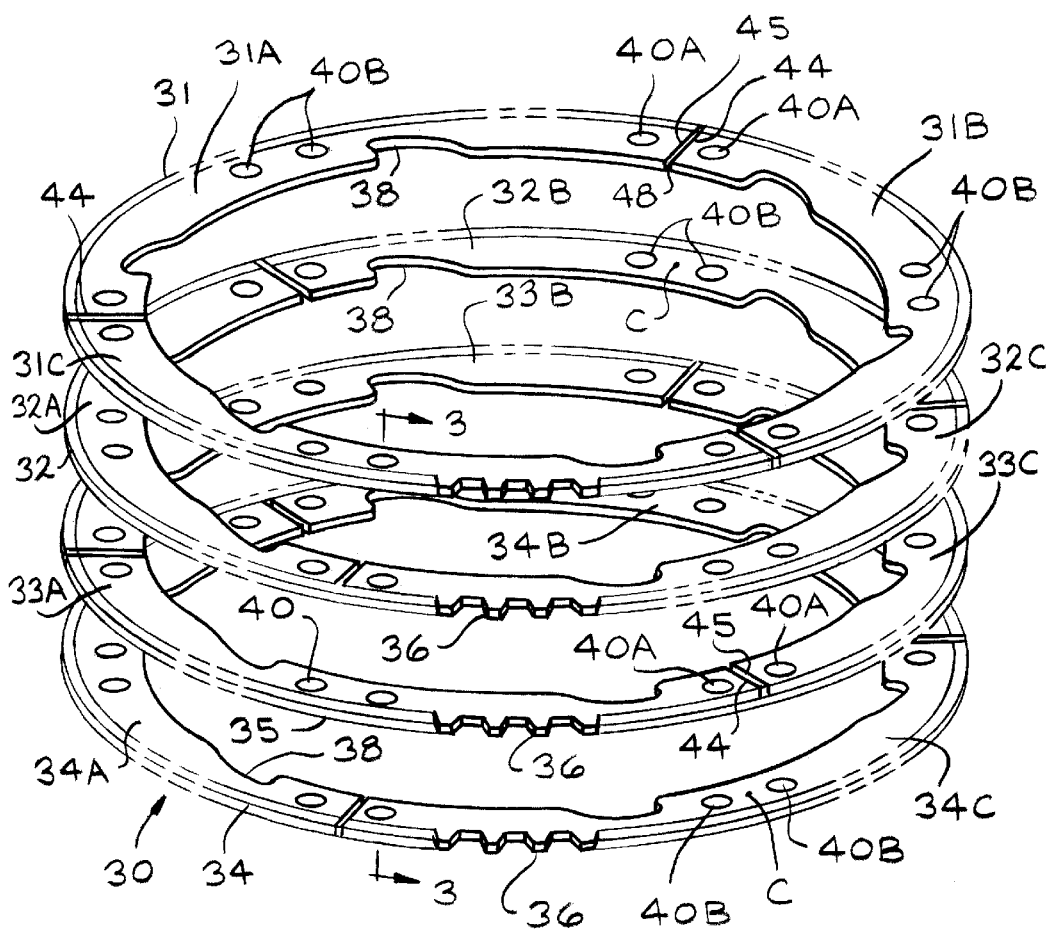
FIG. 2 is an exploded perspective view showing a plurality arcuate sections and lamination layers formed the reform for one form of a race according to the present invention.
Figure 3:
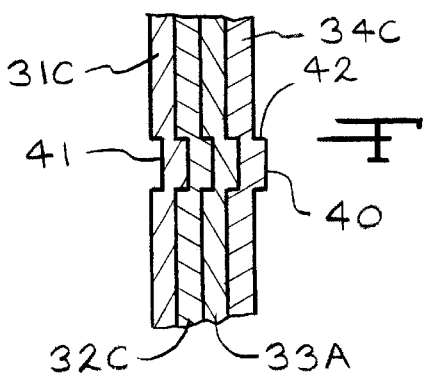
FIG. 3 is a fragmentary sectional view of layers of FIG. 2 joined together to form a lamination.

Referring to FIGS. 2 and 3, there is shown one form of outer race 30 having a plurality of layers or plies (four in the illustration of FIG. 2), including an upper (as viewed in FIG. 2) ply 31, a pair of intermediate plies 32 and 33 and a lower ply 34. In the embodiment of FIG. 2, each ply consists of three segments each defining an arc of slightly less than 120°, hereinafter referred to as "arcuate segment". Thus, the upper ply 31 includes a first arcuate segment 31A, a second arcuate segment 31 B and a third arcuate segment 31C. Similarly, the first intermediate ply 32 consists of a first arcuate segment 32A, a second arcuate segment 32B and a third arcuate segment 32C. The second intermediate ply 33 also includes arcuate segments 33A, 33B, and 33C and the lower ply 34 includes first arcuate segment 34A, second arcuate segment 34B and third arcuate segment 34C. Each arcuate segment extends from a first end 44 to a second end 45 as shown most clearly on arcuate segment 31A. Each of the segments 31A, 31B, 31C, 32A, 32B, 32C, 33A, 33B, 33C, 34A, 34B, and 34C is shown as being stamped with identical radially outwardly extending teeth 36 and radially inwardly facing pockets 38. However, it is not necessary that the arcuate segments be identical to one another.

The number of outwardly extending teeth for a ply such as ply 31 (i.e. the spline count) could, if desired, be divisible by 3 or 4; however, in its broadest application, the spline count does not need to be divisible by 3 or 4.

In stamping the segments 31A through 34C, each segment has stamped therein a plurality of semi-perforations 40, hereinafter referred to as semi-perfs. A semi-perf is a stamped portion which extends only part way through the thickness of the metal. In the embodiment of FIG. 2, each segment 31A through 34C has four semi-perfs 40 spaced strategically in the respective segments. FIG. 3 shows a fragmentary section of each of the four plies of outer race 30 joined together, namely, arcuate segment 31 C joined to arcuate segment 32C, arcuate segment 32C joined to arcuate segment 33A and arcuate segment 33A joined to arcuate segment 34C. FIG. 3 is taken through line 3—3 of FIG. 2 but showing the layers of the plies joined together and rotated 90°.

As may be seen in FIG. 3, each semi-perf 40 is stamped only approximately one-half way through the thickness of the metal forming the respective ply for segment 31C and segment 32C. The semi-perf 40 for each of the other arcuate segments are similarly stamped to extend through only about one-half of the thickness. Each semi-perf 40 accordingly has a pocket 41 on one side and a protrusion 42 on the opposing side. Preferably, the semi-perfs 40 are formed with a circular cross-sectional configuration such that the diameter of the pocket 41 and the diameter of the protrusion 42 are substantially the same but with dimensions such that the protrusions 42 of one segment may be received in the pockets 41 of an adjacent segment. As shown in FIG. 3, the semi-perf 40 of arcuate segment 31C overlies a corresponding semi-perf 40 of arcuate segment 32C and, upon assembly, the protrusion 42 of segment 31C snuggly fits within the pocket 41 of segment 32C.

FIG. 3 is intended to show the interconnection between the semi-perfs 40 of adjacent plies and, taken through line 3—3 of FIG. 2, shows the fragmentary section of one ply joined to a fragmentary section of a single arcuate segment of each adjacent ply. From viewing FIG. 2, however, it is clear that each arcuate segment of one ply is joined to two arcuate segments of each adjacent ply. Thus, arcuate segment 32A is joined to (1) arcuate segments 31A and 31C of upper ply 31 and to (2) arcuate segments 33A and 33B of the second intermediate ply 33. If desired, an additional end ply could be provided in which perforations are stamped completely through in order to receive the protrusion 42 of segment 34C in order that the end ply could be flat.

As can be seen from FIG. 2, each of the arcuate segments 31A through 34C is identical and is provided with four spaced apart semi-perfs 40. One semi-perf 40A is spaced a short distance from each end 44 and 45 of its respective arcuate segment 31A through 34C and each of the other two semi-perfs 40B is spaced apart from the arcuate center C of the respective arcuate segment 31A through 34C a distance equal to the distance from the respective ends 44 and 45 to the adjacent semi-perfs 40A. Thus, as may be seen in viewing FIG. 2, the distance between the two semi-perfs 40B on opposite sides of the center C of an arcuate segment, for example arcuate segment 34C, are spaced apart a distance which will permit one of those semi-perfs 40B to engage the semi-perf 40A adjacent the end 45 of arcuate segment 33C and the other of such semi-perf 40B to engage semi-perf 40A near the end 44 of the adjacent arcuate segment 33A. As can be readily seen from the foregoing and from viewing FIG. 2, the mating ends 44 and 45 of the arcuate segments for one-ply such as the upper ply 31 are not aligned with the mating ends of the arcuate segments for an adjacent ply but rather are aligned with the center C of the arcuate segment of each adjacent ply. As a result of such engagement between the respective semi-perfs 40A and 40B with the laminations in a staggered array in which the end 44 and 45 of the arcuate segments of each ply are aligned with the center C of the arcuate segment of the adjacent ply, the arcuate segments are held in a fixed position to form the race 30.

Preferably, there is a slight gap 48 between adjacent ends 44 and 45 of the respective arcuate segments for clearance to facilitate engagement of the semi-perfs 40A and 40B of adjacent plies. The staggering of the ends 44 and 45 of adjacent layers provides an interlocking for retaining the various arcuate segments 31A through 34C of the various plies into the outer race 30.

In manufacturing inner and outer races of prior art designs, it is frequently necessary to grind the planar exterior or interior surfaces in order to obtain the proper thickness. In the present invention, it has been found that by rotating the components of one layer of the laminate, for example, the layer defined by arcuate segments 31A, 31B and 31C, relative to others of the layers of the lamination such as those defined by arcuate segments 32A through 32C, 33A through 33C and/or 34A through 34C, the thickness of the overall outer race 30 can be maintained to a sufficiently uniform thickness as to avoid the necessity of grinding.

Although the race 30 described in FIG. 2 has been described with each of the arcuate sections being identical, it is within the contemplation of the present invention that certain specific design features could be incorporated into one or more of the arcuate sections and not in others. For example, if desired, one of the plies, for example intermediate ply 32, could be stamped with a different stamping die than the other arcuate segments in order to provide a cavity in which a spring could be positioned or to provide a recess in one of the surfaces suitable for aligning with other recesses or passageways to form a means for introducing lubricating oil through the race.

Figure 4:
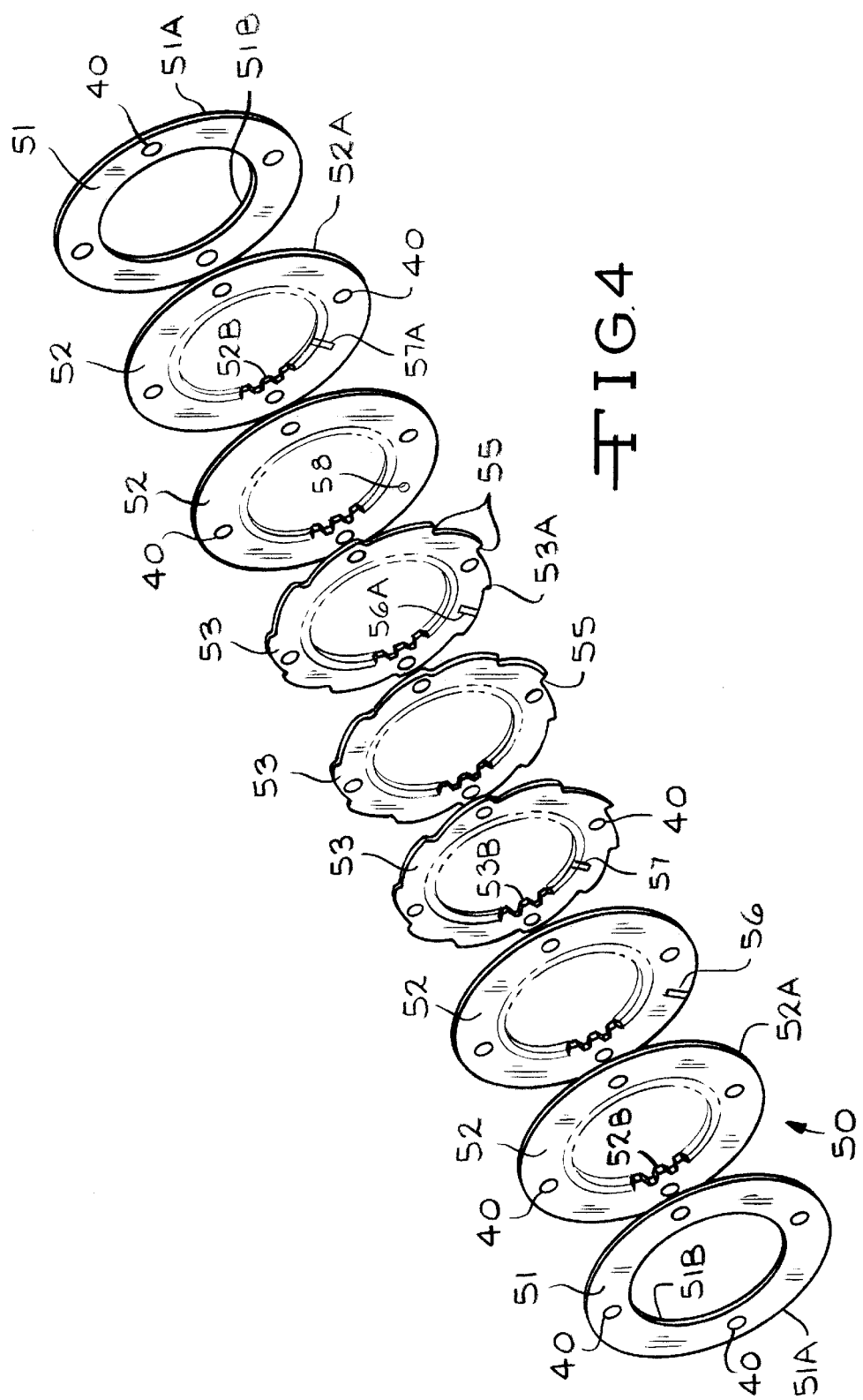
FIG. 4 is an exploded perspective view showing a plurality of lamination layers for another embodiment of race according to the present invention.

Referring to FIG. 4, there is shown an alternate design of race. In this embodiment, an inner race generally designated by the numeral 50 comprises a plurality of plies each of which is formed as a complete circular member. This is in contrast to the embodiment of FIG. 2 in which each ply has a plurality of arcuate members. The inner race 50 illustrated in FIG. 4 includes a pair of end members 51, a first set of intermediate members 52, two of which are adjacent each of the end members 51 and three central members 53 positioned between the innermost ones of the intermediate members 52. The number of intermediate members 52 and central members shown in FIG. 4 is only for the purpose of illustrating the invention. In actuality, for a commercial race, there will be many more layers of intermediate members 52 and central members 53.

As can be seen each of the end members 51 is provided with a smooth radially outer cylindrical edge 51A and a smooth inner cylindrical edge 51B. The intermediate members 52 are provided with a smooth radially outer cylindrical edge 52A and an inner edge 52B which is keyed to mesh with gears. The central members 53 are provided with a plurality of pockets 55 on the outer peripheral edge 53A and a series of gear teeth on the inner edge 53B similar to the gear teeth on the inner edge 52B of the intermediate plies 52.

Each of the end members 51, intermediate members 52 and central members 53 are provided with semi-perfs 40 similar to the semi-perfs of the embodiment of FIG. 2. In the embodiment of FIG. 4, each of the plies is provided with four equally spaced apart semi-perfs 40 maintained at 90° to one another. If desired, there could be provided an additional number of semi-perfs such as 8 or 16 for each of the plies 51, 52, 53. Preferably, each of the plies should have the same number of equally spaced apart semi-perfs 40.

As will be appreciated, the end members 51 will be stamped from one set of dies, the intermediate members 52 from a second set of dies and the central members 53 from a third set of dies. If desired, one or more of the intermediate sections 52 and/or central members 53 could be subjected to a secondary stamping operation to form pockets to receive a spring member, slots to form passageways for the introduction of lubricating oil or to form integral spring members. In FIG. 4, an intermediate member 52 and an adjoining central member 53 are shown as having cooperating radially extending slots stamped therein. The intermediate member 52 is shown as having a radial slot 56 extending from its outer diameter to slightly beyond one-half way toward the inner diameter. The adjacent central member 53 to be joined thereto is shown as having a radial slot 57 of similar breadth extending from the inner diameter to slightly beyond one-half way toward the outer diameter. As a result, when the slotted intermediate member and adjacent central member 53 are joined together with the slot 56 aligned with and overlapping the slot 57, there will be provided a passageway through the adjoining and overlapped slots 56 and 57 extending between the outer diameter and the inner diameter of the inner race 50.

If desired, several laminations of central members 53 and/or intermediate members 52, each having slots extending from the outside diameter to a point beyond the half-way point could be joined with a plurality of central members 53 and/or intermediate members 52, each having slots extending from the inside diameter to a point beyond the half-way point to provide a larger size channel. Additionally, as also shown in FIG. 4 (toward the right) it is possible that the central member 53 having the outer slot 56A be separated from the intermediate member 52 having the inner slot 57A provided that the member therebetween have an aperture 58 which communicates with both slots 56, 57. Many other variations of slots and apertures will be readily apparent to those skilled in the art. In a commercial race having many more intermediate members 52 and central members 53, most and possibly all of the slots 56, 57 and apertures 58 will be in the central members 53.

In assembling the respective end members 51, intermediate members 52 and central members 53 of the inner race 50 shown in FIG. 4, it has been found that there may be slight differences in thickness in the individual members (i.e. the individual end members, intermediate members or central members) as a result of thickness tolerances permitted in the sheet or sheets from which such individual members were stamped. For example, a sheet of steel from which any of the ply members such as the end members 51, intermediate members 52 or central members 53, are stamped having a thickness of 0.047 inch, may have a thickness tolerance on the order of ±0.001 inch. If, in assembling the individual components forming the inner race 50 as shown in FIG. 4, the thicker areas within such tolerance range are aligned, there will be a stack up of the thicker areas for the assembled plies which will result in the inner race 50 having an unacceptable variation in thickness due to such stack up. It has been found that by rotating the individual components such as adjacent ones of the end members 51, intermediate members 52 and central members 53 prior to or during assembling, it is possible to prevent such stack up of tolerances and obtain a race which has thickness uniformity within the specified tolerances. In making such rotation it is, of course, important that the semi-perfs 40 of adjacent members 52, 52 be aligned to telescope together as shown in FIG. 3.

Figure 5:
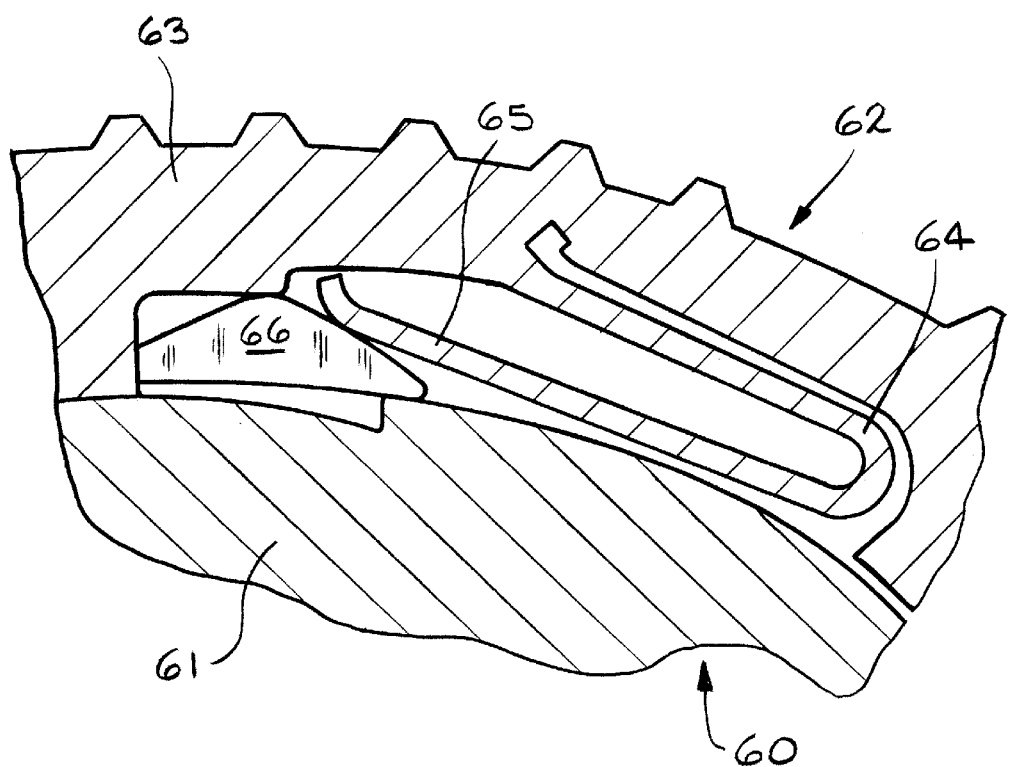
FIG. 5 is a fragmentary view showing a stamped feature incorporated into one of the lamination layers.

In FIG. 5, there is shown an inner race 60 and an outer race 62. For clarity, a section is taken through an intermediate ply 61 of the inner race 60 and through an intermediate ply 63 of the outer race 62. As can be seen, the intermediate ply 63 of the outer race 62 has been stamped with an integral spring member 64 having an arm 65 positioned to engage a pawl 66. Depending upon the breadth of the pawl 66, springs such as the spring 64 could be formed in a number of the adjacent plies of the lamination including if desired, all of the intermediate and central plies and in embodiments utilizing arcuate segments such as the embodiment of FIG. 2 and utilizing complete circular members such as the embodiment of FIG. 4.

Where a spring 64 is stamped in an arcuate segment such as 32A of the embodiment of FIG. 2, it is not necessary that such spring 64 be stamped in any of the other arcuate segments such as 32B or 32C or in the arcuate segments of any of the other plies. Thus, the arcuate segments do not have to be identical.

Figure 6:
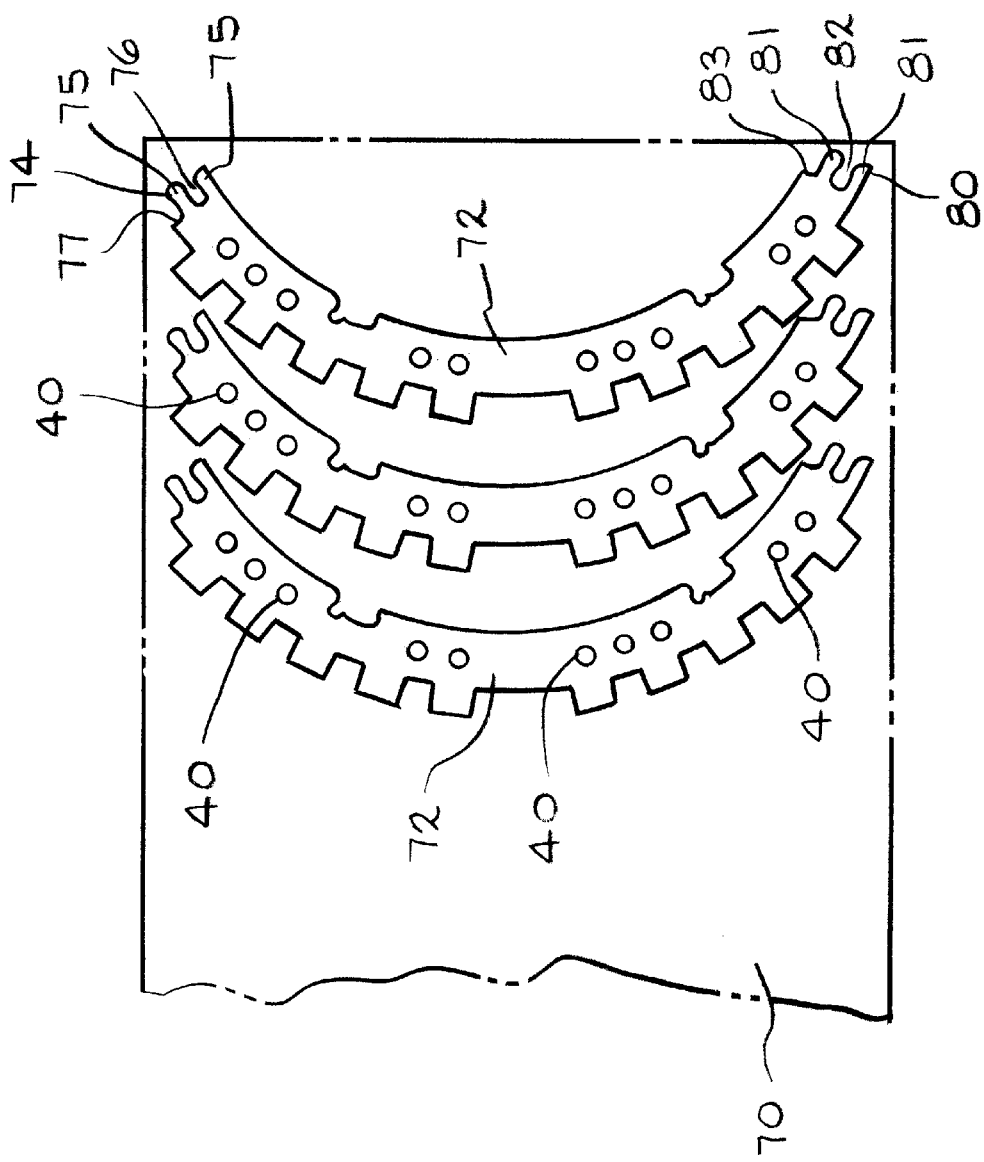
FIG. 6 is a view showing, schematically, multiple stampings made from a single sheet of yet another embodiment.

Referring now to FIG. 6, there is shown in phantom a sheet of steel 70 and a series of arcuate segments 72 stamped therefrom. The arcuate segments 72 were stamped either successively one at a time or, depending upon the die construction, a plurality at a time from the sheet 70. It may be seen that by providing the stamping as arcuate segments 72 rather than as complete circular members such as shown in the embodiment of FIG. 4, very little scrap material is left in the sheet 70 as compared with the amount of scrap from stamping circular elements such as those of FIG. 4.

FIG. 6 also shows another embodiment of arcuate segment 72 as compared with the arcuate segments 31A through 34C of the embodiment of FIG. 2. The arcuate segments 72 are formed to an optimal 90° or 120° arc and are provided with a first end 74 having a pair of tongues 75 and a groove 76 therebetween. Extending radially outwardly from the outer one of the tongues 75 is a shoulder 77.

The arcuate segment 72 extends to a second end 80 having a configuration to be matingly engaged with the first end 74. The second end 80 has a pair of tongues 81 and a groove 82, therebetween. Extending radially inwardly from the inner tongue 81 is shoulder 83. When the first end 74 of an arcuate segment 72 is joined to the second end 80 of an adjacent arcuate segment 72, the radially outer tongue 75 will be engaged with the groove 82 and the radially inner tongue 75 will be positioned in the space defined by the shoulder 83 and outer surface of the radially inner tongue 81. Similarly, the radially inner tongue 81 will be engaged in the groove 76 of its adjacent arcuate segment 72 and the radially outer tongue 81 will be positioned against the shoulder 77 and the outer surface of the radially outer tongue 75.

As with the previous embodiments, each of the arcuate segments 72 is provided with a plurality of semi-perfs 40 positioned and so aligned to permit them to mate with the semi-perfs of adjacent layers of joined arcuate segments 72.

As will be appreciated by those skilled in the art for each of the embodiments, conventional methods of holding the plies/layers of the laminated race may be utilized such as welding, riveting, fasteners and the like.

Many modifications will be become readily apparent to those skilled in the art. Accordingly, the scope of the present invention should be determined solely by the scope of the claims appended hereto.

I claim:

1. A race (30, 50) comprising a plurality of layers (31–34 and 51–53) joined together, each layer having one or more semi-perfs (40) defining on one side a protrusion (42) and on the other side a recess (41), the protrusions (42) of a layer being engaged to recesses (41) of an adjacent layer, said joined layers including first and second end layers (51) and one or more intermediate layers (52, 53), said end and intermediate layers (51–53) having an inner edge (51B–53B) and an outer edge (51A–53A), the inner edge (51B–53B) or outer edge (51A–53A) of at least one of said end and intermediate layers being noncircular (52B, 53A, 53B), characterized in that at least one of said layers (52) has an outer slot (56) extending from said outer edge (52A) toward said inner edge (52B) and at least one adjacent layer (53) has an inner slot (57) extending from said inner edge (53B) toward said outer edge (53A), said inner slot (57) and said outer slot (56) overlapping when said layers are in mating relationship.

2. A race (30, 50) comprising a plurality of layers (31–34 and 51–53) joined together, each layer having one or more semi-perfs (40) defining on one side a protrusion (42) and on the other side a recess (41), the protrusions (42) of a layer being engaged to recesses (41) of an adjacent layer, said joined layers including first and second end layers (51) and one or more intermediate layers (52, 53), said end and intermediate layers (51–53) having an inner edge (51B–53B) and an outer edge (51A–53A), the inner edge (51B–53B) or outer edge (51A–53A) of at least one of said end and intermediate layers being noncircular (52B, 53A, 536), characterized in that at least one of said layers (52, 53) has an outer slot (56, 56A) extending from said outer edge (52A, 53A) toward said inner edge (52B, 53B) and at least one additional layer (52, 53) has an inner slot (57, 57A) extending from said inner edge (52B, 53B) toward said outer edge (52A, 53A), said inner slot (57, 57A) and said outer slot (56, 56A) being in communication with each other when said end layers (51), intermediate layers (52, 53) are joined together.

3. A race according to claim 2, wherein a non-slotted layer (52) is positioned between the layer (53) having said outer slot (56A) and the layer (52) having said inner slot (57A), said non-slotted layer (52) having an aperture (58) providing communication between said outer slot (56A) and said inner slot (57A).

4. A race (30, 50) comprising a plurality of layers (31–34 and 51–43) joined together, each layer having one or more semi-perfs (40) defining on one side a protrusion (42) and on the other side a recess (41), the protrusions (42) of a layer being engaged to recesses (41) of an adjacent layer, some of said layers (51–53), prior to assembly, generally defining a complete circle, characterized in that at least one of said layers includes an integral spring (64) formed therewith.

5. A race (30, 50) comprising a plurality of layers (31–34 and 51–53) joined together, each layer having one or more semi-perfs (40) defining on one side a protrusion (42) and on the other side a recess (41), the protrusion (42) of a layer being engaged to recesses (41) of an adjacent layer, at least one of said layers comprising a plurality of arcuate segments (31A–31C) characterized in that at least one of said arcuate segments includes an integral spring (64) formed therewith.

6. A race (30, 50) comprising a plurality of layers (31–34 and 51–53) joined together, each layer having one or more semi-perfs (40) defining on one side a protrusion (42) and on the other side a recess (41), the protrusion (42) of a layer being engaged to recesses (41) of an adjacent layer, each of a plurality of said layers (31–34) being formed as a plurality of arcuate segments (31A–34C), each arcuate segment extending from a first end (44) to a second end (45), said layers arranged such that the adjacent first (44) and second ends (45) of arcuate segments of one layer (31) are misaligned with adjacent first (44) and second ends (45) of an adjacent layer (32).

7. A race according to claim 6, wherein the first end (44) of one arcuate segment (31A) and the adjacent second end (45) of another arcuate segment (31B) are spaced to define a gap (48) therebetween.

8. A race according to claim 7, wherein said gap (48) overlies a central portion (C) of an adjacent arcuate segment (32B).

9. A race (30, 50) comprising a plurality of layers (31–34 and 51–53) joined together, each layer having one or more semi-perfs (40) defining on one side a protrusion (42) and on the other side a recess (41), the protrusion (42) of a layer being engaged to recesses (41) of an adjacent layer, a plurality of said layers (31–34) being formed from a plurality of arcuate segments (31A–34C), said arcuate segments extending from a first end (74) having a tongue (75) and groove (76) configuration to a second end (80) having a tongue (81) and groove (82) configured to mate with the tongue (75) and groove (76) arrangement of the first end (74) of an adjoining arcuate segment characterized in that said layers are arranged such that the adjacent first (74) and second ends (80) of arcuate segments of one layer (31) are misaligned with adjacent first (74) and second ends (80) of an adjacent layer (32).

\* \* \* \* \*